United States Patent [19]
Nguyen

[11] Patent Number: 5,930,713
[45] Date of Patent: Jul. 27, 1999

[54] PROACTIVE COMMUNICATION OF MOBILE STATION POSITION INFORMATION FOLLOWING INTER-EXCHANGE HANDOFF

[75] Inventor: Viet Nguyen, Montreal, Canada

[73] Assignee: Telefonaktiebolaget L M Ericsson (publ), Stockholm, Sweden

[21] Appl. No.: 08/864,660

[22] Filed: May 28, 1997

[51] Int. Cl.⁶ .................................................. H04Q 7/00
[52] U.S. Cl. .......................................... 455/440; 455/456
[58] Field of Search .................................. 455/436, 440, 455/456, 445, 439; 370/331

[56] References Cited

U.S. PATENT DOCUMENTS

| | | | |
|---|---|---|---|
| 5,153,902 | 10/1992 | Buhl et al. | 379/57 |
| 5,208,756 | 5/1993 | Song | 364/449 |
| 5,210,787 | 5/1993 | Hayes et al. | 379/60 |
| 5,218,367 | 6/1993 | Sheffer et al. | 342/457 |
| 5,218,716 | 6/1993 | Comroe et al. | 455/33.4 |
| 5,235,633 | 8/1993 | Dennison et al. | 379/60 |
| 5,259,017 | 11/1993 | Langmantel | 379/58 |
| 5,299,132 | 3/1994 | Wortham | 364/460 |
| 5,327,144 | 7/1994 | Stilp et al. | 342/387 |
| 5,339,352 | 8/1994 | Armstrong et al. | 379/58 |
| 5,341,410 | 8/1994 | Aron et al. | 379/59 |
| 5,343,512 | 8/1994 | Wang et al. | 379/59 |
| 5,369,684 | 11/1994 | Buhl et al. | 379/59 |
| 5,408,419 | 4/1995 | Wong | 364/514 |
| 5,422,813 | 6/1995 | Schuchman et al. | 364/449 |
| 5,432,841 | 7/1995 | Rimer | 379/59 |
| 5,479,481 | 12/1995 | Koivunen | 379/59 |
| 5,479,483 | 12/1995 | Furuya et al. | 379/60 |
| 5,504,804 | 4/1996 | Widmark et al. | 379/63 |
| 5,546,445 | 8/1996 | Dennison et al. | 379/60 |
| 5,606,596 | 2/1997 | Jain et al. | 455/440 |
| 5,613,205 | 3/1997 | Dufour | 455/440 |
| 5,682,380 | 10/1997 | Park et al. | 370/331 |
| 5,826,188 | 10/1998 | Tayloe et al. | 455/440 |

FOREIGN PATENT DOCUMENTS

WO 98/00988  1/1998  WIPO.

OTHER PUBLICATIONS

PCT International Search Report, Oct. 16, 1998, PCT/SE 98/00991.
*Wireless Emergency Services JEM Report* Nov. 2, 1994.

*Primary Examiner*—Salvatore Cangialosi
*Attorney, Agent, or Firm*—Jenkens & Gilchrist, P.C.

[57] ABSTRACT

The present invention comprises a system and method for proactively conveying mobile station position information with a network. In the context of completing an inter-exchange handoff of a mobile station communication, a request for facilities (such as a communications traffic channel) is made by an anchor mobile switching center of a serving mobile switching center. This request for facilities includes an indication that the anchor mobile switching desires to be kept up-to-date on mobile station position. In particular, the indication asks the serving mobile switching center to monitor mobile station position as well as changes thereto, and inform the anchor mobile switching center when the monitored position changes by a request specified predetermined degree. In response to the indication, the serving mobile switching center detects mobile station position, compares the detected position against a prior detected position, and reports the current position to the anchor mobile switching center if the current and prior positions differ by at least the predetermined degree.

12 Claims, 4 Drawing Sheets

PROACTIVE COMMUNICATION OF MOBILE STATION POSITION INFORMATION FOLLOWING INTER-EXCHANGE HANDOFF

BACKGROUND OF THE INVENTION

1. Technical Field of the Invention

The present invention relates to locating the geographic position of a mobile station operating within a cellular telephone network and, in particular, to proactively providing geographic position information following inter-exchange handoff.

2. Description of Related Art

Conventional cellular telephone technology, by itself, does not include the capability of pinpointing, with any reasonable or useful degree of accuracy, the location of the mobile subscriber. For example, using a conventional cellular telephone network, the extent of the position information precision typically available is to identify the cell within which a mobile station is located. Some cells, though, have a coverage radius in excess of one kilometer. Thus, cell location identification accordingly provides little, if any, assistance in actually locating the position of the subscriber. Accordingly, a number of systems have been proposed to assist in the location determination and provide more accurate position information. One system utilizes a triangulation or arcuation process to determine an approximate location of the caller through an analysis of signal strength measurements and/or propagation delay times of the cellular communications. Another system utilizes the existing Global Positioning System (GPS) with a GPS receiver attached to the cellular telephone to obtain geo-coordinates for the mobile station.

Although many systems have been proposed for more precisely identifying the location of a mobile station, it is equally important that the determined position information, regardless of its accuracy, be provided and distributed through the network when needed. Consider, for example, the situation where a law enforcement agency desires to know the location of either a mobile station or the person using the mobile station. Thus, for a mobile station located in a stolen vehicle, the law enforcement agency would want to monitor the location of the mobile station, and hence the stolen vehicle itself, to assist in apprehending the thief. Alternatively, a law enforcement agency may have an interest in monitoring not only the cellular telephone communications made by a cellular service subscripting suspect, but also the locations from which those calls are occurring. It is necessary then that the law enforcement agency be able to instruct the cellular telephone network to make a position determination on a particular mobile station and relay that information back for use in tracking the suspect.

Furthermore, cellular subscribers now frequently use their mobile stations to make emergency (911) calls. Unlike conventional land line telephones, mobile stations have no fixed address relating to a location which may be obtained by the public safety answering point (PSAP) when an emergency call is made. It is similarly necessary then that the public safety answering point be able to instruct the cellular telephone network to provide updated position information on a particular mobile station from which an emergency call originates and relay that information back for use in dispatching emergency service aid.

In yet another example, with the implementation of an Intelligent Network (IN) architecture, a number of new service features are being provided which require knowledge of mobile station position. For instance, with location dependent call forwarding, the C-number to which a call is transferred depends on where in the network the called mobile station is located. Location dependent network handling is further becoming more of an issue with respect to the service actions taken by other network nodes such as a home location register (HLR). It is likewise necessary then that a network node, such as a service control point in an Intelligent Network or a home location register, be able to signal the cellular telephone network to provide updated position information on a particular mobile station and relay that information back for use in triggering or completing service provision.

In conventional call handling situations, obtaining location information does not present a significant problem as the requesting entity (law enforcement, PSAP, or network node) may make a request of the mobile switching center serving a cellular call for the location information. The process of obtaining location information is significantly complicated, however, when an inter-exchange hand-off of the cellular call occurs. Requests in this case cannot be directed to the newly serving mobile switching center. The reason for this is that the originally serving (i.e., anchor) mobile switching center handling the call remains in the call connection after hand-off occurs, and knowledge of the currently serving mobile switching center is not readily available. There is a need then for a mechanism which would allow the serving mobile switching center to provide location information to the anchor mobile switching center following an inter-exchange hand-off.

SUMMARY OF THE INVENTION

In the context of completing an inter-exchange handoff of a mobile station communication, a request for facilities (such as a communications traffic channel) is issued from an anchor exchange to a newly serving exchange. This request further asks the serving exchange to monitor mobile station position as well as changes thereto, and inform the anchor exchange when the monitored position changes by a request specified predetermined degree. Responsive thereto, the serving exchange monitors mobile station position, compares a current position against a prior position, and reports the current position to the anchor exchange if the current and prior positions differ by at least the request specified predetermined degree.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
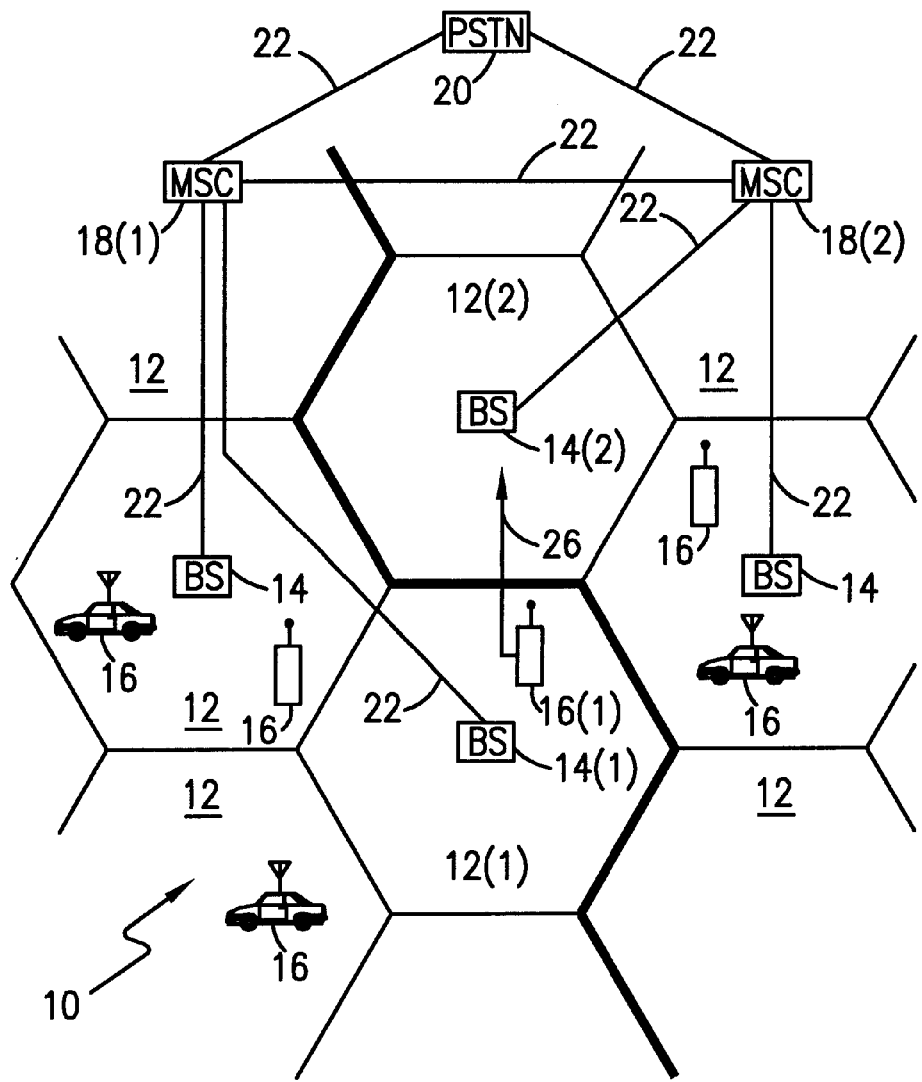
FIG. 1 is a cell diagram illustrating an exemplary cell configuration for a cellular telephone network in which the present invention may be implemented.

Reference is now made to FIG. 1 wherein there is shown a cell diagram illustrating an exemplary cell configuration for a cellular telephone network 10 in which the present invention may be implemented. The cellular telephone network 10 operates in accordance with one of a number of known air interface types including, for example, a frequency division multiple access (FDMA) protocol or a time division multiple access (TDMA) protocol, which provide for the use of at least one control channel and a plurality of traffic channels per cell 12. In the network 10, a base station 14 is provided for each of the cells 12. The base stations 14 engage in simultaneous communications with plural mobile stations 16 operating roughly within the area of the associated cell 12. The control channel assigned to each cell 12 is used to carry system control messages between the base station 14 and proximately located mobile stations 16, and also to assist in the network with mobile station cell reselection. Such control messages include call originations, page signals, page response signals, location registration signals, traffic channel assignments, maintenance instructions, and cell selection or re-selection instructions. The traffic channels provided in each cell 12 are used to carry subscriber voice or data communications between the base station 14 and proximately located mobile stations 16.

The base stations 14 further communicate via signaling links and voice trunks 22 with a central control station, commonly referred to as a mobile switching center 18, which functions to control operation of the network 10. The mobile switching centers 18 are interconnected with each other and to the public switched telephone network (PSTN) 20 by the signaling links and voice trunks 22. The mobile switching centers 18 operate to selectively connect subscriber voice and data communications to the mobile stations 16 through its base stations 14. Thus, the mobile switching centers 18 control system operation through and in response to the transmission of control messages over the control channels to set-up on the traffic channels calls that are either originated by or terminated at the mobile stations 16. The mobile switching centers 18 further control, through and in response to control and traffic channel transmissions, the handoff of a subscriber communication from a traffic channel of one cell 12 to a traffic channel of another cell as the subscriber mobile station 16 roams throughout the cellular service area during an ongoing communication.

As the mobile stations 16 move within the service area of the network 10, instances arise where a mobile station passes between two cells 12 served by the same mobile switching center 18, or from one cell served by a first mobile switching center 18(1) to another cell served by a second mobile switching center 18(2). In moving between the cells 12 in either case, the mobile stations 16, in conjunction with base station 14 information and orders exchanged with and between the mobile switching centers 18, have an opportunity through hand-off to change the base station through which cellular radio communications are being effectuated.

Figure 2A:
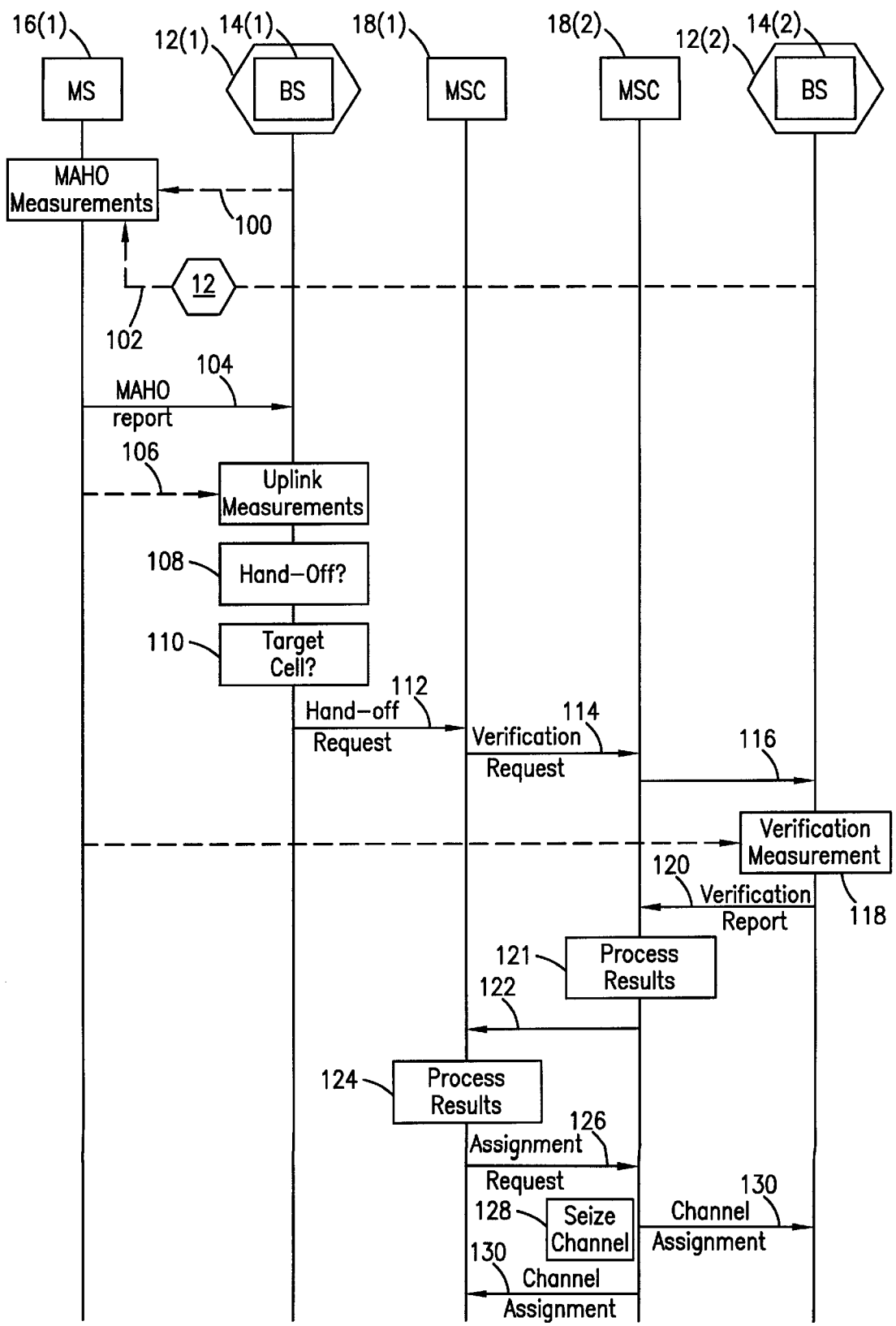
FIGS. 2A–2B are message flow and network operation diagrams illustrating operation of the network of FIG. 1 in connection with an inter-exchange hand-off.
Figure 2B:
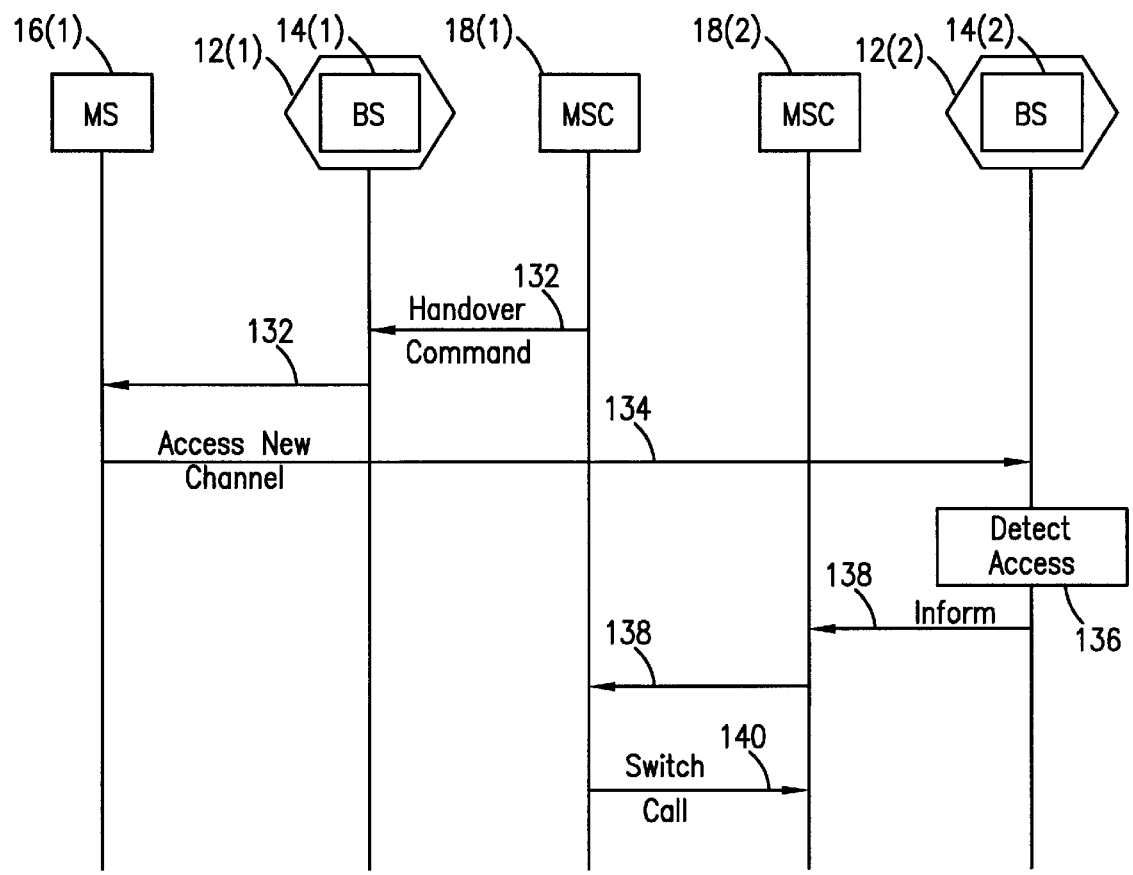

Reference is now made in combination to FIGS. 1 and 2A–2B wherein FIGS. 2A–2B are message flow and network operation diagrams illustrating operation of the network 10 of FIG. 1 in connection with the inter-exchange hand-off of a mobile station 16(1) from a cell 12(1) served by a first mobile switching center 18(1) to a cell 12(2) served by a first mobile switching center 18(2). The mobile station 16(1), operating if capable in accordance with known mobile assisted hand-off (MAHO) principles, periodically makes downlink signal strength measurements 100 on the traffic channel (of cell 12(1) served by first mobile switching center 18(1)) that is currently being used, and also periodically makes downlink signal strength measurements 102 on the control channels of network identified cells 12, including cell 12(2) served by the second mobile switching center 18(2), which neighbor to the cell 12(1). These signal strength measurements are reported 104 to the base station 14(1) for the currently serving cell 12(1). The base station 14(1) concurrently makes uplink signal strength measurements 106 on the traffic channel that is currently being used by the mobile station 16(1). These are the only measurements 106 made with respect to non-MAHO capable mobile stations 16.

The base station 14(1) processes the mobile station 16(1) reported 104 downlink signal strength measurements (100 and 102), if available, and the base station made uplink signal strength measurements (106) to determine first whether a hand-off is necessary (action 108) and second, if yes, to which cell or cells (candidates) the hand-off could and/or should preferably occur (action 110). It is now assumed that the base station 14(1) determines 108 from deteriorating measured uplink and/or downlink signal strengths that a hand-off is necessary. It is further assumed that an identification 110 is made of cell 12(2) as the preferred candidate (target) cell for hand-off. A request 112 for hand-off including information comprising an identification of the currently serving cell 12(1), the traffic channel being used for communication with mobile station 16(1) in cell 12(1), and the target cell 12(2) for hand-off, is then sent by the base station 14(1) to the serving mobile switching center 18(1). A hand-off if approved in this instance would comprise an inter-exchange hand-off because the target cell 12(2) is served by a mobile switching center 18(2) different from the mobile switching center 18(1) serving the current cell 12(1). The foregoing description is only an example of the procedure used in making the determination to institute a hand-off. It will, of course, be understood that more than one target cell 12 may be identified by the process of action 110 for further hand-off consideration.

The currently serving mobile switching center 18(1) then sends a message 114 to the mobile switching center 18(2) associated with the target cell 12(2) requesting verification of base station 14(2) communications capability with the mobile station 16(1). It is understood that multiple messages 114 may be sent if more than one target cell 12 has been identified for further hand-off consideration. The message 114, similar to the request 112 sent by the base station 14(1), includes information comprising an identification of the currently serving cell 12(1) and the traffic channel being used for communication with mobile station 16(1) in cell 12(1). Responsive thereto, the mobile switching center 18(2) sends a message 116 to the base station 14(2) for the target cell 12(2) to make a verifying signal strength measurement (action 118) on the traffic channel currently being used by the mobile station 16(1) in the currently serving cell 12(1).

The base station 14(2) then reports 120 the results of the verification signal strength measurement to the mobile switching center 18(2). An evaluation of the verification signal strength measurement is then made (action 121) by the mobile switching center 18(2) to confirm the locating of the mobile station in view of expected signal strengths. After the evaluation, the mobile switching center 18(2) forwards 122 the results of the verification measurement back to the mobile switching center 18(1). The results are then processed (action 124) by the mobile switching center 18(1) to determine whether a hand-off to target cell 12(2) should be made.

If the determination is affirmative with respect to the target cell 12(2), and if no other target cell is identified as a better choice, the mobile switching center 18(1) sends a message 126 to the mobile switching center 18(2) requesting assignment (and reservation) of a traffic channel for hand-off to the target cell 12(2). A traffic channel is seized (action 128), and then both the base station 14(2) and mobile switching center 18(1) are informed 130 of the assignment by the mobile switching center 18(2) of the traffic channel in the target cell 12(2). The mobile switching center 18(1) then sends a message 132 to the mobile station 16(1) via the base station 14(1) for the currently serving cell 12(1) with a handover command directing the mobile station to switch to the assigned traffic channel in the target cell 12(2). The mobile station 16(1) then tunes to and accesses 134 the assigned traffic channel. When the base station 14(2) detects the mobile station access (action 136), the mobile switching centers 18(1) and 18(2) are informed 138, and the call is switched 140 to the mobile switching center 18(2) for further handling to complete the hand-off procedure.

Figure 3:
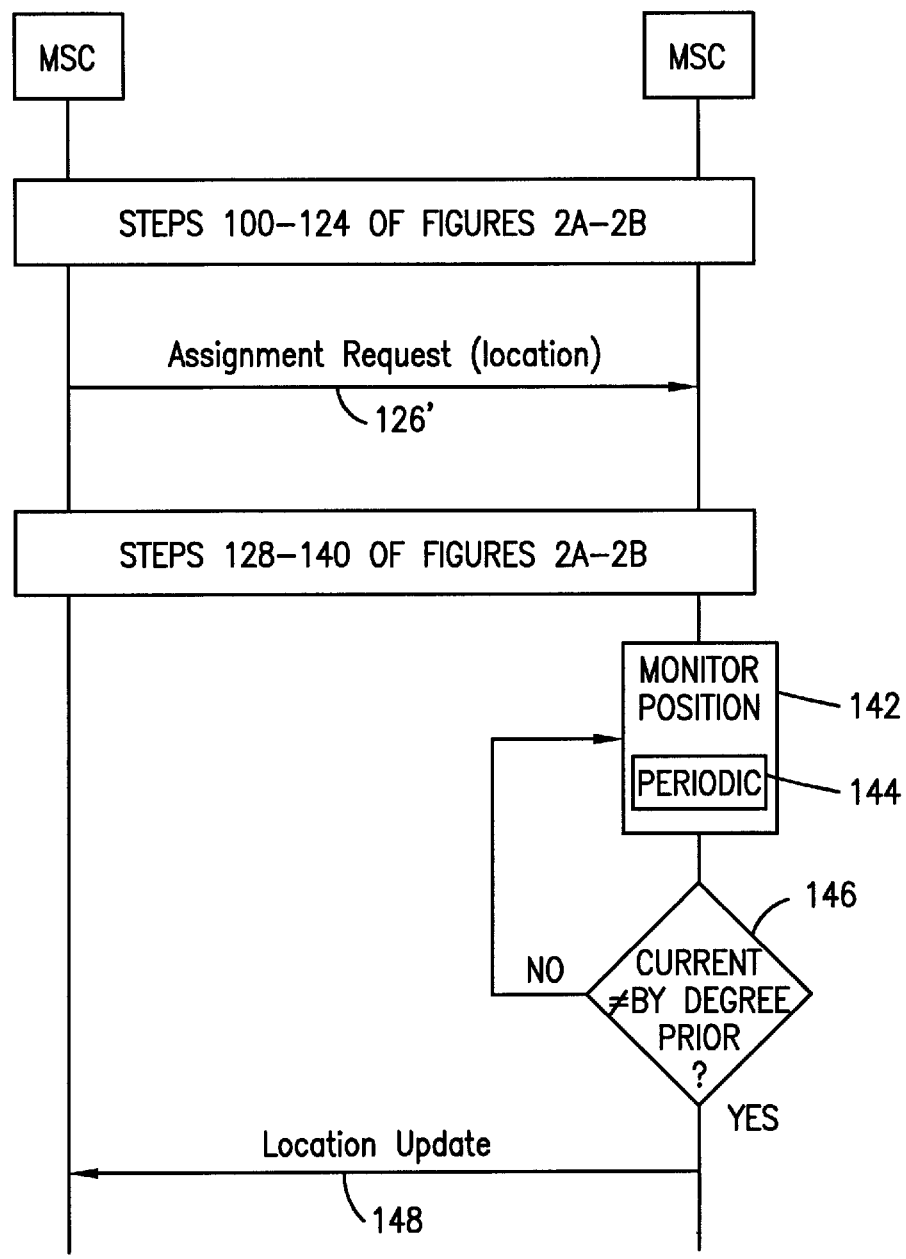
FIG. 3 is a message flow and network operation diagram illustrating operation of the network of FIG. 1 in connection with a proactive communication of mobile station position information following an inter-exchange hand-off.

Reference is now made in combination to FIGS. 1 and 3 wherein FIG. 3 is a message flow and network operation diagram illustrating operation of the network 10 of FIG. 1 in connection with a proactive communication of mobile station 16(1) position information following an inter-exchange hand-off. For purposes of this discussion and the illustration of FIG. 3, the steps and actions 100–124 of FIGS. 2A–2B are incorporated by reference. Following a determination that target cell 12(2) is the best choice for hand-off, the mobile switching center 18(1) sends a message 126' to the mobile switching center 18(2) requesting assignment (and reservation) of a traffic channel for hand-off to the target cell 12(2). This message 126' differs from the message 126 of FIGS. 2A–2B in that it includes additional parameters indicating that the first mobile switching center 18(1) desires to be kept up-to-date as to the position of the mobile station 16(1). If the message 126 comprises the TIA/EIA IS-41 facilities directive message, the message 126' may comprise that same message with the relevant mobile station position parameters included in either available or newly created fields. The included parameters not only provide an indication that the first mobile switching center 18(1) desires to be kept up-to-date as to the position of the mobile station 16(1), but also specify a degree of change in mobile station position which must occur before the first mobile switching center is to be provided with a position update.

For purposes of this discussion and the illustration of FIG. 3, the steps and actions 128–140 of FIGS. 2A–2B are also incorporated by reference. Following switching 140 of the call to the mobile switching center 18(2), the second mobile switching center 18(2) monitors mobile station 16(1) position (action 142). Such monitoring may, for example, comprise the making of periodic mobile station 16(1) position determinations (action 144). A comparison is then made in action 146 as to whether a current one of the position determinations differs from an immediately prior one of the position determinations by the degree specified in the parameters of the message 126'. If so, a location identification message 148 is generated and sent from the second mobile switching center 18(2) to the first mobile switching center 18(1). The process then returns to continue with the monitoring 144 of mobile station 16(1) position, along with the determination 146 of mobile station position changes in excess of the message 126' specified degree.

The determination of mobile station 16(1) position may be made by the mobile switching center 18(2) in accordance with any one of a number of known methods. For example, one way to determine position is to rely on information supplied from a Global Positioning System (GPS) transceiver connected to the mobile station, with system determined geo-coordinates being extracted by the mobile station and transmitted to the mobile switching center. A second way to determine position is to use the cell area where the target mobile station is currently located, with the cell identification information for the currently serving base station being transmitted to the mobile switching center. A third way to determine position is to use measurements (signal strength or timing advance) made by the base stations in the vicinity of the mobile station, with the acquired measurement information being transmitted to the mobile switching center. A fourth way to determine position is to use measurements (signal strength or timing advance) made by the mobile station itself, with the acquired measurement information being transmitted to the mobile switching center. A fifth way to determine position is to rely on a determination made by a separate location system, such as satellite Doppler, LORAN-C, direction finders, time of arrival triangulation (arcuation) processors, or signal strength triangulation (arcuation) processors, with the acquired measurement information being transmitted to the mobile switching center. Once received by the mobile switching center, the measurement information is processed in the manner described above for the purpose of determining mobile station position changes in excess of the message 126' specified degree. The degree, for example, may comprise a predetermined geographic distance, or a change in cell location.

The message 126' is sent, instead of the message 126 (FIGS. 2A–2B), by the anchor mobile switching center 18(1) in those instances where it is aware that current mobile station position is at issue. For example, such is the case when the call is being monitored by a law enforcement agency, when the call includes a public service answering point (PSAP) as a party, or when the call may invoke a location dependent service feature. In this regard, the anchor mobile switching center may be programmed to automatically recognize the calling situations where current mobile station position is at issue, or alternatively may receive an instruction in connection with initial call set-up from the law enforcement agency monitoring center, public service answering point, service control point, or home location register, to keep track of mobile station position. Responsive to either situation, the message 126' is sent in connection with the hand-off procedure.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In connection with an inter-exchange hand-off of a mobile station cellular call from an anchor exchange to a newly serving exchange, a method for keeping the anchor exchange up-to-date on mobile station position during the call, comprising the steps of:

signaling the newly serving exchange from the anchor exchange with an instruction to keep the anchor exchange up-to-date on mobile station position;

monitoring by the newly serving exchange of mobile station position during the call; and following hand-off:

comparing by the newly serving exchange of a current mobile station position with a prior mobile station position; and signaling the anchor exchange from the newly serving exchange during the call with the current mobile station position.

2. The method as in claim 1 wherein the step of signaling the newly serving exchange comprises the step of signaling the newly serving exchange with the instruction wherein the instruction includes an indication of a predetermined degree by which the current mobile station position must differ from the prior mobile station position and, wherein said step of signaling the anchor exchange further comprises the step of signaling the anchor exchange from the newly serving exchange during the call with the current mobile station position if the current mobile station position differs from the prior mobile station position by said predetermined degree.

3. The method as in claim 1 wherein the instruction to keep the anchor exchange up-to-date on mobile station position is embedded within a facilities directive message sent from the anchor exchange to the newly serving exchange.

4. The method as in claim 1 wherein the step of monitoring comprises the step of periodically making mobile station position determinations.

5. A method for inter-exchange hand-off, comprising the steps of:

detecting a need for a hand-off of a mobile station cellular communication currently being handled through an anchor exchange;

identifying a cell served by a target exchange as a target for the hand-off;

transmitting a message from the anchor exchange to the target exchange requesting assignment of a traffic channel in the cell to carry the mobile station cellular communication, the message further requesting that the target exchange keep the anchor exchange up-to-date as to mobile station position during the mobile station cellular communication;

switching the mobile station cellular communication to the assigned traffic channel in the cell served by the target exchange; and thereafter communicating mobile station position from the target exchange to the anchor exchange during the mobile station cellular communication.

6. The method as in claim 5 wherein the step of communicating mobile station position comprises the steps of:

monitoring by the target exchange of mobile station position during the mobile station cellular communication;

comparing by the target exchange of a current mobile station position with a prior mobile station position; and signaling the anchor exchange from the target exchange with the current mobile station position if the current mobile station position differs from the prior mobile station position by a predetermined degree.

7. The method as in claim 6 wherein the step of transmitting comprises the step of signaling the target exchange with the request to keep the anchor exchange up-to-date on mobile station position that includes an indication of the predetermined degree by which the current mobile station position must differ from the prior mobile station position.

8. The method as in claim 6 wherein the step of monitoring comprises the step of periodically making mobile station position determinations.

9. The method as in claim 6 wherein the message comprises a facilities directive message sent from the anchor exchange to the target exchange, with the message embedding the request to keep the anchor exchange up-to-date on mobile station position.

10. A cellular communications system, comprising:

an anchor exchange through which a mobile station cellular communication is initially being handled, and from which a request to be kept up-to-date on mobile station position is issued; and a newly serving exchange through which the mobile station cellular communication is currently being handled following an inter-exchange hand-off, the newly serving exchange operating, in response to the request issued by the anchor exchange during the mobile station cellular call to monitor mobile station position during the mobile station cellular communication and report a current mobile station position to the anchor exchange if the current mobile station position differs from a prior mobile station position by a predetermined degree.

11. The method as in claim 10 wherein the request comprises a facilities directive message sent from the anchor exchange to the newly serving exchange.

12. The method as in claim 10 wherein the request includes an indication of the predetermined degree by which the current mobile station position must differ from the prior mobile station position.

* * * * *